United States Patent
Samuel et al.

(10) Patent No.: US 10,838,785 B2
(45) Date of Patent: Nov. 17, 2020

(54) BIOS TO OS EVENT COMMUNICATION

(71) Applicant: Dell Products L.P., Round Rock, TX (US)

(72) Inventors: Balasingh Ponraj Samuel, Round Rock, TX (US); Anand Prakash Joshi, Round Rock, TX (US); Jagadish Babu Jonnada, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/269,553

(22) Filed: Feb. 6, 2019

(65) Prior Publication Data
US 2020/0250017 A1    Aug. 6, 2020

(51) Int. Cl.
| | |
|---|---|
| G06F 3/00 | (2006.01) |
| G06F 9/54 | (2006.01) |
| G06F 9/4401 | (2018.01) |
| G06F 16/17 | (2019.01) |
| G06F 11/07 | (2006.01) |
| G06F 11/22 | (2006.01) |

(52) U.S. Cl.
CPC ............ G06F 9/542 (2013.01); G06F 9/4406 (2013.01); G06F 11/0787 (2013.01); G06F 11/2284 (2013.01); G06F 16/1734 (2019.01)

(58) Field of Classification Search
CPC ................................ G06F 9/542; G06F 13/385
USPC .............................................. 719/318; 710/1
See application file for complete search history.

(56) References Cited

U.S. PATENT DOCUMENTS

| | | | | |
|---|---|---|---|---|
| 5,495,566 A | * | 2/1996 | Kwatinetz | G06F 3/0485 345/684 |
| 2005/0060526 A1 | * | 3/2005 | Rothman | G06F 9/4401 713/1 |
| 2006/0155977 A1 | * | 7/2006 | Padilla | G06F 9/4401 713/1 |
| 2010/0268828 A1 | * | 10/2010 | Pahlavan | H04L 67/148 709/227 |
| 2012/0198263 A1 | * | 8/2012 | Berke | G06F 1/3203 713/340 |
| 2013/0138938 A1 | * | 5/2013 | Bang | G06F 9/4411 713/2 |
| 2018/0246552 A1 | * | 8/2018 | Thompson | G06F 11/3058 |

OTHER PUBLICATIONS

Jun Sun, Supporting Multiple OSes with OS Switching. (Year: 2007).*

* cited by examiner

*Primary Examiner* — Lechi Truong
(74) *Attorney, Agent, or Firm* — Norton Rose Fulbright US LLP

(57) ABSTRACT

A BIOS of an information may transmit information regarding events detected by the BIOS to an OS of an information handling system for logging in an OS event log. A BIOS of an information handling system may detect an event and may log information regarding the event in a memory of an information handling system. An OS of the information handling system may retrieve at least a portion of the information regarding the event from the event log and may add at least a portion of the retrieved information to an OS event viewer.

15 Claims, 6 Drawing Sheets

BIOS TO OS EVENT COMMUNICATION

FIELD OF THE DISCLOSURE

The instant disclosure relates to communication between a basic input-output system (BIOS) and an operating system (OS) of an information handling system. More specifically, portions of this disclosure relate to notifying an OS of BIOS events.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a basic input/output system (BIOS) to initialize hardware and boot an operating system (OS). The BIOS may, in some cases, include a unified extensible firmware interface (UEFI). While initializing the information handling system, the BIOS may perform a variety of tests on system hardware and firmware components to verify functionality and detect events, such as errors or irregularities in hardware or firmware operation. After the information handling system finished initializing, the BIOS may continue to monitor operation of information handling system hardware and firmware for events. The OS may monitor for events in operating system functionality and application execution.

The OS and BIOS may each record detected events in separate logs. The separation of OS and BIOS event logs may be inconvenient for a user as a user may be required to examine two separate event logs to determine whether an information handling system is in good operating condition. Accessing a BIOS of an information handling system at OS runtime to determine whether the BIOS has detected any system events, in addition to accessing an OS event log may be time consuming. Further, applications for monitoring for and resolving system errors may be limited to accessing an OS event log and may be unable to access a system BIOS which may prevent such applications from obtaining a holistic view of a status of the information handling system.

Shortcomings mentioned here are only representative and are included simply to highlight that a need exists for improved information handling systems, particularly for communication of events between a BIOS and an OS of an information handling system. Embodiments described herein address certain shortcomings but not necessarily each and every one described here or known in the art. Furthermore, embodiments described herein may present other benefits than, and be used in other applications than, those of the shortcomings described above.

SUMMARY

A path for communication of detected system events between a BIOS and an OS of an information handling system may allow aggregation of information regarding detected events from both a BIOS and an OS in a native event viewer of the OS. The events aggregated in the OS event viewer may be stored in a system memory accessible by an OS and, in some cases, applications executed by the OS. Such aggregation may enhance a user experience, allowing a user to obtain a more complete view of a status of an information handling system at a single location in an OS environment. For example, if BIOS events are detailed in an OS event viewer, a user may bypass the time consuming process of accessing the BIOS of the information handing system to view BIOS event information. Furthermore, aggregation of detected events in a single OS event viewer may allow for more robust applications executed by the OS to analyze event information for both BIOS and OS events to report and/or resolve system errors. For example, granting software applications access to both BIOS and OS event information in an OS event viewer may allow the applications to identify, and in some cases resolve, causes of events where such applications may be unable to do so with OS event information alone. Thus, aggregation of BIOS and OS events in a single OS event viewer may improve the operation of information handling systems by allowing for more robust error detection, analysis, and resolution.

A BIOS of an information handling system, which may include a UEFI, may monitor hardware and firmware components to detect system events. For example, one or more embedded controllers of the information handling system may monitor for events in associated hardware and/or firmware and may report detected events to the BIOS. In some embodiments, the BIOS may test one or more hardware and/or firmware components of the information handling system during a pre-boot stage, while the information handling system is initializing. The BIOS may also direct one or more embedded controllers of the information handling system to perform one or more tests and to report event information to the BIOS. After initialization, the BIOS may monitor system hardware and firmware for system events that occur at OS runtime.

The BIOS may store information regarding events in an event log of a memory of the information handling system. The memory may be a non-volatile random access memory (NVRAM) of the information handling system. The BIOS may store results of tests performed during a pre-boot stage in the BIOS event log. The results may include information regarding events detected during firmware and/or hardware component testing. The BIOS may also store information regarding events detected at OS runtime in the event log of the memory.

The OS of the information handling system may retrieve at least some of the information regarding events from the event log of the memory of the information handling system. For example, an OS management service, run by the OS during booting of the OS, may notify the BIOS when the OS is ready to receive information regarding events. The BIOS may detect the notification and may transmit event information from the BIOS event log to the OS event viewer/collector.

In some embodiments, the BIOS may notify the OS that an event has been detected. The OS may then retrieve the at least some of the information regarding the event stored by the BIOS based on the notification. For example, the BIOS may notify the OS of a severity of a detected event, and the OS may determine whether or not to retrieve information regarding the event based, at least in part, on the severity of the event.

After retrieving information regarding detected events, the OS may add retrieved information to an OS event viewer. For example, the OS may combine information regarding events detected by the BIOS with information regarding events detected by the operating system in the OS event viewer so that users and/or applications may access OS and BIOS event data at a single location. After information is retrieved from the BIOS, it may be removed from the log of the memory of the information handling system to free up storage space. For example, the BIOS or OS may delete or overwrite the retrieved information.

An information handling system may include a processor and memory for performing the steps described herein. The steps described herein may also be included in a non-transitory computer readable medium of a computer program product.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
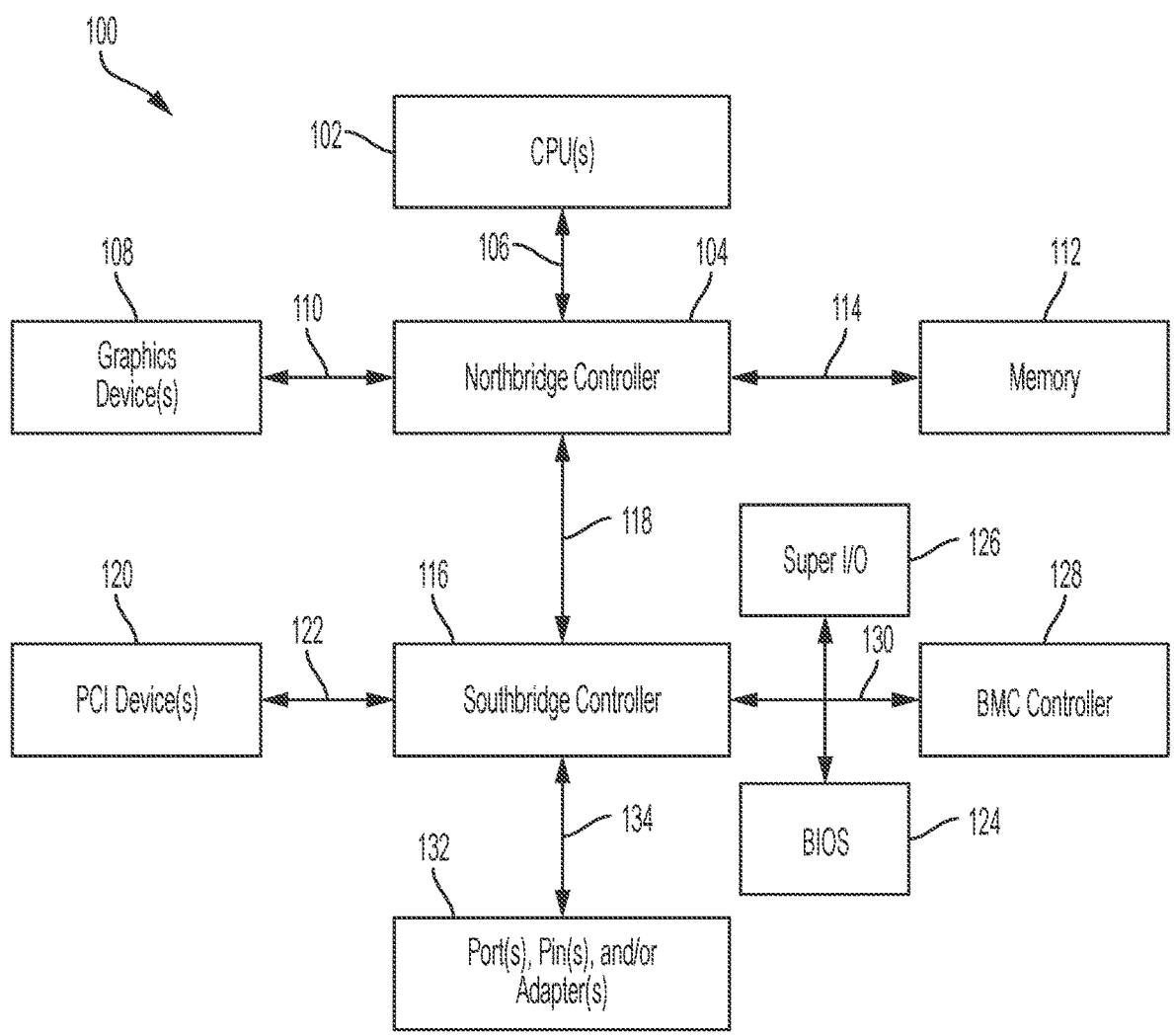
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. For example, BIOS may also refer to a set of instructions, stored on BIOS 124, that are executed by CPU(s) 102. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some embodiments, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some embodiments, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
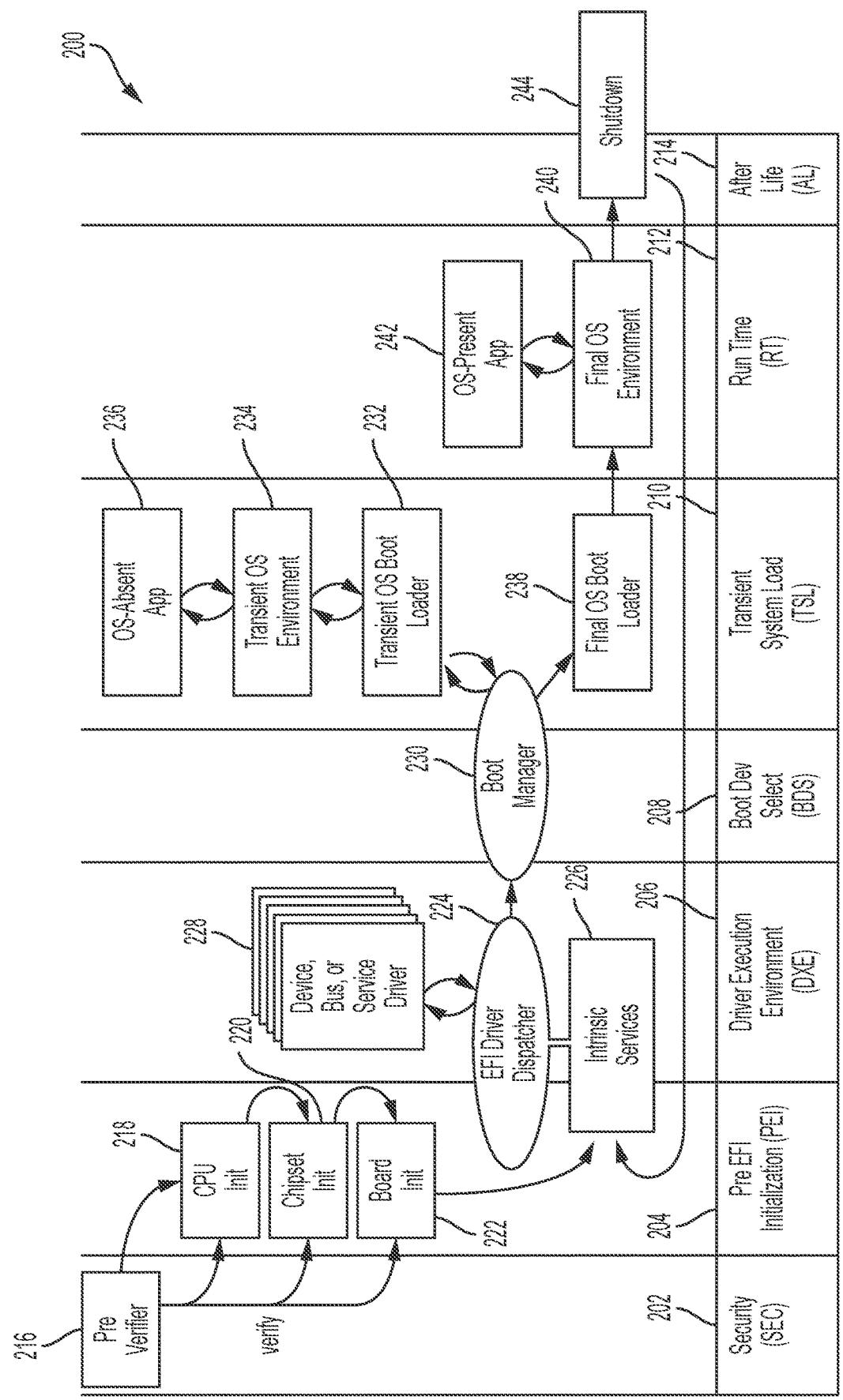
FIG. 2 is a process diagram of example information handling system operation according to some embodiments of the disclosure.

When an information handling system is powered up or restarted, the information handling system may enter a pre-boot stage to initialize and configure hardware and firmware, prepare the information handling system for booting of the operating system, and boot the operating system. The pre-boot stage may begin when the information handling system is powered on and may finish when the information handling system has completed booting of an operating system. An example flowchart 200 including a pre-boot stage is shown in FIG. 2. After an IHS is powered on, the IHS may enter a security phase 202 of the pre-boot stage, wherein the BIOS/UEFI may perform a pre-verify operation 216 to examine the security certificate and verify that the device is ready for secure operation. After the security phase 202, the IHS may enter a pre-extensible firmware interface initialization phase 204, wherein the IHS may initialize a CPU at block 218, initialize a chipset at block 220, and initialize a motherboard at block 222. After initializing the CPU, chipset, and motherboard, the IHS may initialize intrinsic services at block 226 and may enter a driver execution environment at block 206. The IHS may initiate an extensible firmware interface driver dispatcher 224 which may execute device, bus, and/or service drivers at block 228. The EFI driver dispatcher may then initialize a boot manager at block 230 and the IHS may enter a boot device select (BDS) phase at block 208 to select a boot device. In some embodiments, a pre-boot graphical user interface may be initialized when the information handling system exits a driver execution environment stage at block 206 and enters a boot device select stage at block 208. The information handling system may then enter a transient system load (TSL) phase at block 210 where the boot manger may initialize a transient OS boot loader at block 232, a transient OS environment at block 234, and an OS-absent application at block 236. The boot manger may initialize a final OS boot loader at block 238 to initialize final operation of the operating system. The information handling system may then enter a run time phase at block 212 where a final OS environment is presented at block 240, and an OS-present application is executed at block 242. When the information handling system enters the run time phase at block 212, the pre-boot stage may end. When an information handling system is powered down, it may enter an after life stage at block 214 and may perform a shutdown operation at block 244. In some embodiments, if an information handing system is simply restarted, it may bypass a security stage at block 202 and proceed directly to initialization of intrinsic services at block 226.

Figure 3:
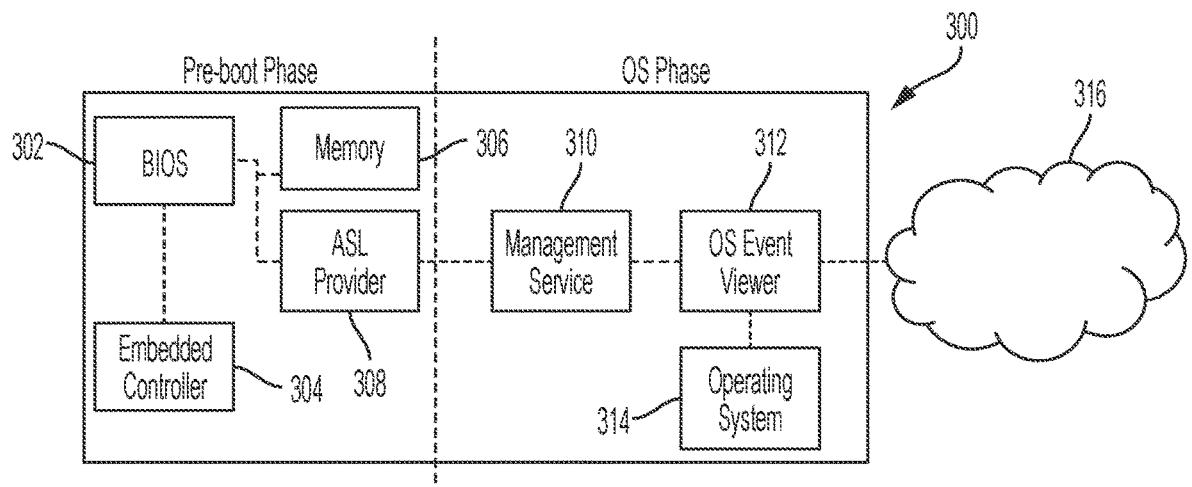
FIG. 3 is a block diagram of an example information handling system according to some embodiments of the disclosure.
Figure 4:
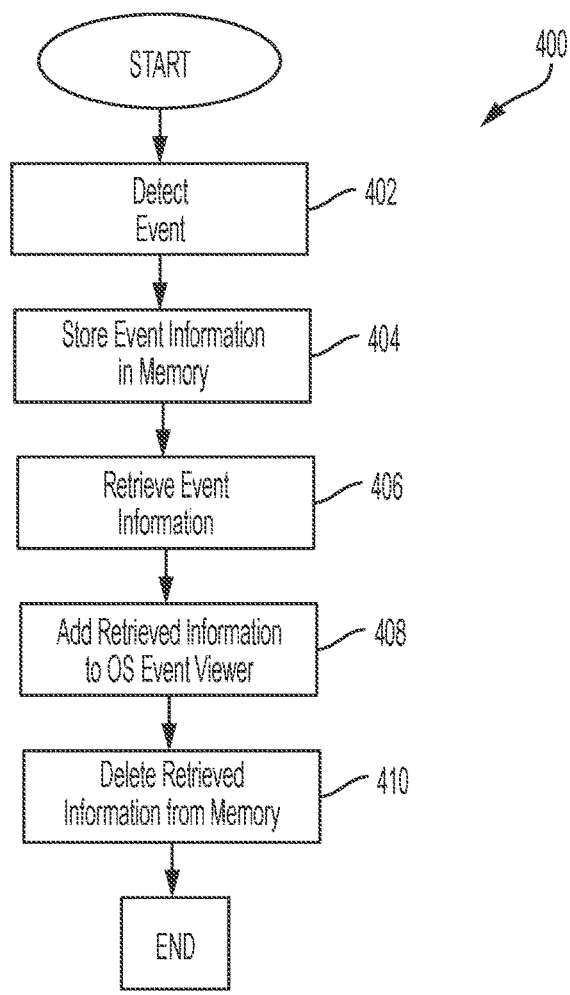
FIG. 4 is a flow chart diagram of an example method for event communication between a BIOS and an OS according to some embodiments of the disclosure.

A BIOS of an information handling system may detect system events while initializing hardware and firmware components of the information handling system, in addition to monitoring for and detecting system events at runtime of an OS of the information handling system. An example information handling system 300, shown in FIG. 3 may include a BIOS 302. The BIOS 302 may include a UEFI. The BIOS may, during a pre-boot stage, initialize hardware and firmware components of the information handling system, as discussed with respect to FIGS. 1 and 2. While the BIOS 302 is initializing components, the BIOS 302 may perform a variety of tests on system components to verify system health. For example, the BIOS 302 may perform extensive on-board diagnostics. The BIOS 302 may instruct an embedded controller 304 of the information handling system 300 to test one or more components and may test the embedded controller 304 itself. The embedded controller 304 may perform tests on various hardware and firmware components as well and may report results of the tests, which may include detected system events, to the BIOS 302. The BIOS 302 may also test a variety of other system hardware and/or firmware components in addition to the embedded controller 304. The BIOS 302 may save test information, which may include detected system events, to a memory 306, such as an NVRAM, of the information handling system 300. In some embodiments, an enhanced pre-boot system diagnostics (ePSA) routine of the BIOS 302 may perform testing and may record testing results, such as information regarding detected events. The BIOS 302 and/or embedded controller 304 may also monitor for system events at runtime of an OS of the information handling system 300, and the BIOS 302 may store information regarding detected events in the memory 306. The BIOS 302 may detect a variety of events during a pre-boot stage and at OS runtime such as security events, BIOS events, thermal events, fan failure, and/or critical battery levels. Although a single embedded controller 304 is shown, the information handling system 300 may include multiple embedded controllers and system components, such as components shown in and discussed with respect to FIG. 1.

The BIOS 302 may communicate with an OS event viewer 312 of the information handling system through an advanced configuration and power interface source language (ASL) provider 308. The ASL provider 308 may, in some embodiments, be integrated into the BIOS 302. For example, the ASL provider 308 may be code run in the context of the OS 314 executed by the BIOS 302. In some embodiments, the ASL provider 308 may be a Windows management interface (WMI) ASL provider. The ASL provider 308 may communicate with a management service 310 to provide event information to an event viewer 312. The management service 310 may be executed by an OS 314 of the information handling system 300. For example, a Windows management interface service. The management service 310 may include one or more applications using a Windows application programming interface (API) to retrieve events from the BIOS. The event viewer 312 may also be executed by an OS of the information handling system 300. In some embodiments, the event viewer 312 may be a Windows event viewer. Thus, the BIOS 302 may transmit event information to a management service 310 via an ASL provider 308. The management service 310 may provide the event information to the event viewer 312. The event viewer 312 may also receive event information from the OS 314 of the information handling system. Event information received from the OS 314 may include event information related to applications and services executed by the OS 314 of the information handling system 300. Event information aggregated by the event viewer 312 may be accessed through a network 316, such as by a remote client. For example, an information technology (IT) management console may access the event viewer 312 through the cloud. Thus, the event viewer 312 may aggregate event information from the BIOS 302 and event information from the OS 314 in a single location. The aggregation of BIOS and OS events in an OS event viewer 312 may allow third party applications to access BIOS event log information through the OS event viewer 312, facilitating more robust system diagnostic applications.

A method 400 for aggregating event information by an OS event viewer may begin, at step 402 with detection of an event. A BIOS of an information handling system may detect an event during a pre-boot stage. For example, a BIOS may detect events during a pre-extensible firmware interface initialization phase, as discussed with respect to phase 204 of FIG. 2, during a driver execution environment phase, as discussed with respect to phase 206 of FIG. 2, during a boot device select phase, as discussed with respect to phase 208 of FIG. 2, and/or during a transient system load phase, as discussed with respect to phase 210 of FIG. 2. Alternatively or additionally, the BIOS may monitor system components for events at OS runtime. Detected events may include events such as security events, such as disabling or enabling of a trusted platform module (TPM) or system password events, BIOS events, thermal events, fan failure, critical battery levels.

At step 404, the BIOS may store event information regarding the detected event in a memory of the information handling system. For example, event information may be stored in a BIOS event log of an NVRAM of the system. In some embodiments, the BIOS may enable one or more embedded controllers to directly store event information in the BIOS event log. Stored event information may include information related to security events, such as disabling or enabling of a trusted platform module (TPM) or system password events, BIOS events, thermal events, fan failure, critical battery levels.

At step 406, the event information may be retrieved. For example, a BIOS may inform an operating system of the information handling system that an event has occurred at OS runtime. The information handling system may then request information regarding the event from the BIOS, and the BIOS may provide the requested information to the OS. Alternatively or additionally, the BIOS may boot an operating system of the information handling system. Once the OS has reached a stage in booting where it is ready to receive event information from the BIOS, it may notify the BIOS that it is ready to receive event information. The BIOS may then provide the OS with information related to events detected in a pre-boot stage. Communication between the BIOS and OS may occur via an ASL provider of the BIOS and a management service of the OS. In some embodiments, the BIOS may save information in a memory of the information handling system, such as in NVRAM, in a form accessible by the OS, and a management service of the OS may directly access the event information.

After event information is retrieved, the event information may be added, at step 408, to an event viewer, such as an OS event viewer. Thus, the OS event viewer may include information regarding events detected by a BIOS of the information handling system and information regarding events detected by the OS. In some embodiments, the BIOS may, at step 410, delete event information that has been retrieved by the OS and added to an OS event log from the BIOS event log stored in memory. Such removal may open memory space for recording further events detected by the BIOS.

In some embodiments, different steps may be executed by different processors or processing cores. A BIOS and an OS may be executed on first and second processing cores, respectively. The first processing core or processor may execute steps performed by the BIOS, such as detecting an event, at block 402, storing event information in a memory, at block 404, and deleting retrieved information, at block 410. The second processing core or processor may perform steps executed by an OS, such as retrieving event information, at block 406, and adding retrieved information to an OS event viewer, at block 408.

Figure 5:
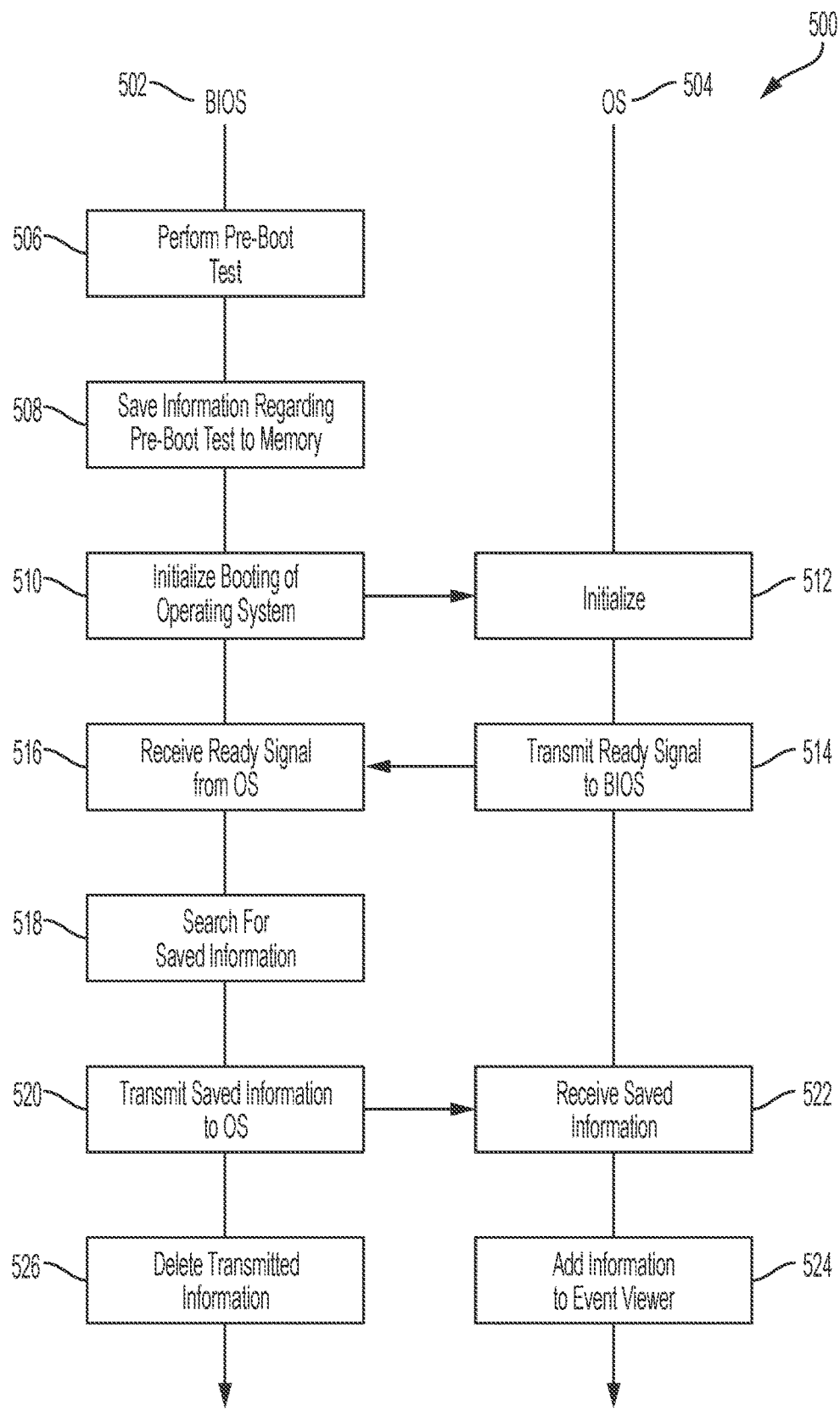
FIG. 5 is a process flow diagram of an example process for communication of pre-boot events between a BIOS and an OS according to some embodiments of the disclosure.

When initializing an information handling system, a BIOS may test hardware and software components of the information handling system. During such testing, the BIOS may detect one or more events. The BIOS may record testing results, including detected events in a BIOS event log of a memory of an information handling system and may later transmit such information to an OS event log of the system. An example process flow diagram 500, shown in FIG. 5, illustrates communication of event information, collected during a pre-boot stage, between a BIOS 502 and an OS 504 of an information handling system. The process 500 may begin with a BIOS 502 performing a pre-boot test, at step 506. For example, when an information handling system is initialized, a BIOS 502 may perform a basic test of one or more system hardware and/or firmware components. The BIOS 502 may, for example, perform thermal analysis, fan tests, memory tests, and/or security tests of system components. In some embodiments, the BIOS 502 may instruct one or more embedded controllers to perform such tests and may receive the results of testing from the embedded controllers.

At step 508, the BIOS 502 may save information regarding the pre-boot test to memory. For example, the BIOS 502 may save information regarding the pre-boot test to a BIOS event log in an NVRAM of an information handling system. The information regarding the pre-boot test may include information regarding one or more events detected while testing system hardware and firmware components, such as security events, such as disabling or enabling of a trusted platform module (TPM) or system password events, BIOS events, thermal events, fan failure, critical battery levels, and other events. For example, the BIOS 502 may save information relating to a security profile of the system and attempted password unlock events, including timestamps, telemetry, and other information related to such events. The BIOS 502 may also record information related to detected errors, along with timestamps for the detected errors. In some embodiments, the BIOS 502 may direct embedded controllers testing system components to directly save such results of tests to a memory of the information handling system.

At step 510, a BIOS 502 may initialize booting of an OS 504 of an information handling system. The OS 504 may initialize, at step 512. While the OS 504 is initializing, it may execute a management service, such as a Windows Management Interface (WMI) service. When the OS 504 is ready to receive event information from the BIOS 502, OS 504 may transmit a ready signal, at step 514, to the BIOS 502. For example, a management service of the OS 504 may transmit a ready signal to the BIOS 502. At step 514, the BIOS 502 may receive the ready signal from the OS 504. In some embodiments, an ASL provider of the BIOS 502 may monitor for the ready signal and may transmit an acknowledgement to the OS 504 that it has received a ready signal.

After being informed that the OS 504 is ready to receive event information, the BIOS 502 may, at step 518, search for saved event information. For example, the BIOS 502 may search a BIOS event log of an NVRAM of the system to determine if the BIOS 502 recorded any information during the pre-boot stage. The BIOS 502 may then retrieve the saved event information, and may transmit the saved information, at step 520, to the OS 504. In some embodiments, the BIOS 502 may transmit event information to the OS 504 across multiple intervals. Transmission of large amounts of event information may cause a slowdown in information handling system performance. Thus, in some embodiments, if the information regarding events collected by the BIOS 502 during the pre-boot stage exceeds a predetermined size limit, the BIOS 502 may break the information up into several sets to transmit to the OS 504. In some embodiments, the information handling system may use a frequency of a processor of the system to determine a current workload of the system. Based on the current workload and/or the amount of event information to be transmitted, the BIOS 502 may split the information regarding events into several sets of information for transmission to the OS 504 at several time intervals.

At step 522, the OS 504 may receive the saved event information from the BIOS 502. The OS may then, at step 524, add the event information to an OS event viewer. For example, the OS management service may receive the event information from the BIOS 502 and may log the information in the OS event viewer. At step 526, the BIOS 502 may delete event information that was transmitted to the OS 504 to free up space on the system memory. Thus, event information collected by a BIOS during a pre-boot stage may be transmitted to an OS and added to an OS event viewer, so that OS and BIOS event information can be aggregated at a single location.

Figure 6:
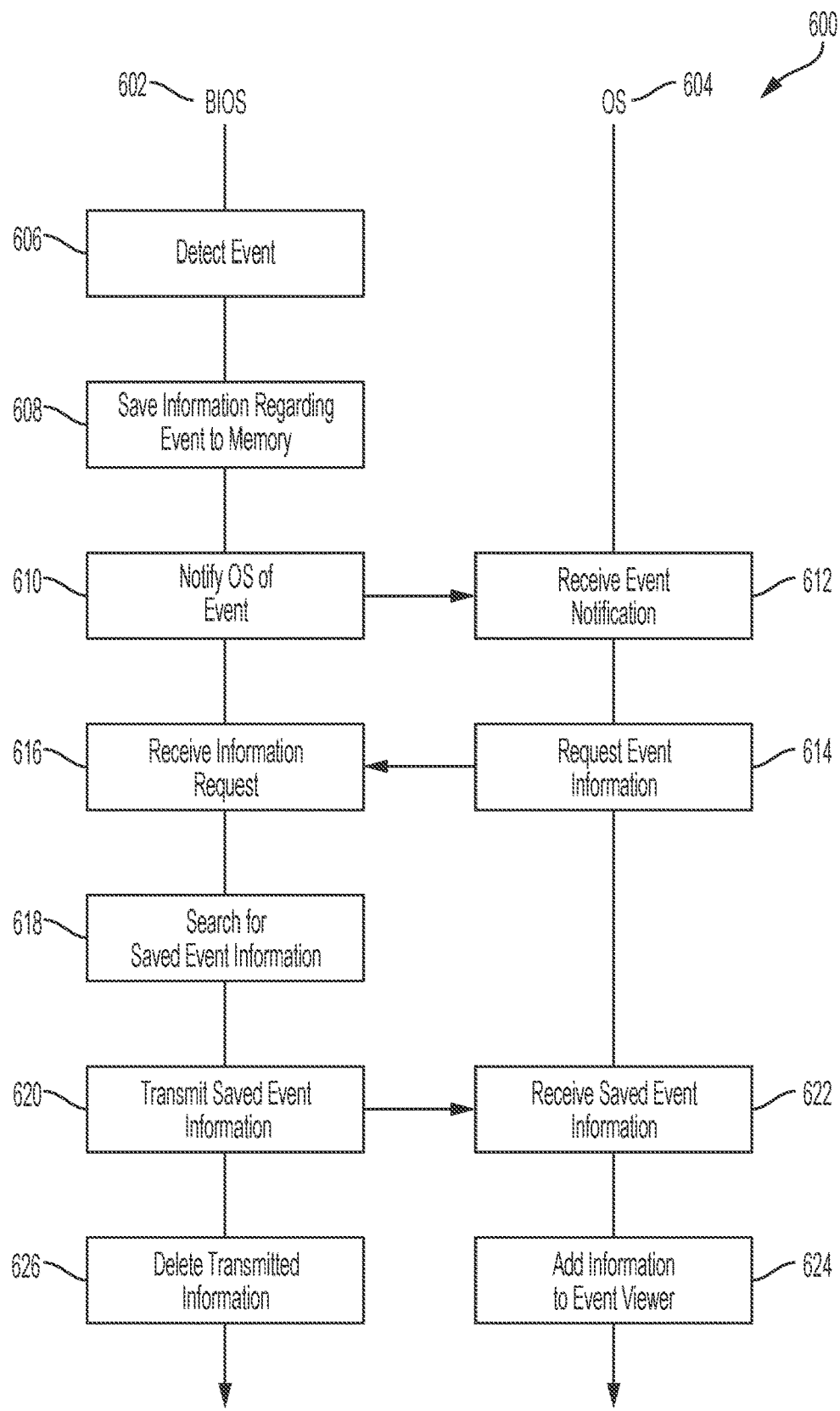
FIG. 6 is a process flow diagram of an example process for communication of OS runtime events between a BIOS and an OS according to some embodiments of the disclosure.

A BIOS may also transmit information for BIOS events detected by the BIOS at OS runtime to an OS of an information handling system. An example process flow diagram 600, shown in FIG. 6, illustrates communication of event information, collected at OS runtime, between a BIOS 602 and an OS 604 of an information handling system. At step 606 a BIOS 602 may detect an event. For example, a BIOS 602 may operate in system management mode (SMM) to monitor for hardware and/or firmware events, such as errors, that may occur at OS runtime. One or more embedded controllers may also work with the BIOS 602 to monitor hardware for events.

When an event is detected, the BIOS 602 may save event information, at step 608, such as error information and an event timestamp, to a memory, such as an NVRAM, of the information handling system. Saved event information may include information related to security events, BIOS events, thermal events, fan failure, critical battery levels, and other events. At step 610, the BIOS 602 may notify the OS 604 of the event. For example, an ASL provider of the BIOS 602 may transmit a notification to the OS 604 that an event has been detected. At step 612, the OS 604 may receive the event notification. For example, a management service of the OS may monitor for and receive the BIOS event notification from the ASL provider of the BIOS 602. In some embodiments, the notification may include information detailing a type or severity of the detected event.

At step 614, the OS may request event information. In some embodiments, the OS 604 may determine whether to request event information based on a type or severity of the event, detailed by the event notification. For example, based on the severity of an event, the OS 604 may either request information immediately or wait for a power event, such as a reboot or shutdown, to retrieve the event information. In some embodiments, the management service may be configurable by a user to customize when event information should be requested, such as by setting severity thresholds or enabling immediate information requests for certain types of events. In some embodiments, the severity and categorization of events may be automatically adjusted based on activity of a user of the information handling system. At step 616, the BIOS 602 may receive the request for event information. For example, an ASL provider of the BIOS 602 may receive the request for event information. At step 618, the BIOS 602 may search for saved event information. For example, the BIOS 602 may search a BIOS event log of a memory, such as an NVRAM, of the information handling system for event information. In some embodiments, the BIOS 602 may determine criticality and may determine whether or not to transmit information regarding events to the OS 604 based on that determination. The BIOS 602 and/or the OS 604 may prioritize runtime events over other events.

At step 620, the BIOS 602 may transmit saved event information to the OS 604. For example, an ASL provider of the BIOS 602 may transmit event information to a management service of the OS 604. In some embodiments, the BIOS 602 may transmit event information to the OS 604 across multiple intervals. Transmission of large amounts of event information may cause a slowdown in information handling system performance. Thus, in some embodiments, if the information regarding events collected by the BIOS 602 at OS runtime exceeds a predetermined size limit, the BIOS 602 may break the information up into several sets to transmit to the OS 604. In some embodiments, the information handling system may use a frequency of a processor of the system to determine a current workload of the system. Based on the current workload, the BIOS 602 may split the information regarding events into several sets of information for transmission to the OS 604 at several time intervals. This may, together with requesting event information based on event severity, reduce information handling system slowdown caused by transmitting event information from a BIOS to an OS.

At step 622, the OS 604 may receive the event information from the BIOS 602. The OS 604 may then, at step 624, add the event information to an OS event viewer. For example, the OS management service may receive the event information from the BIOS 602 and may log the information in the OS event viewer. At step 626, the BIOS 602 may delete event information that was transmitted to the OS 604 to free up space on the system memory. Thus, event information collected by a BIOS at OS runtime may be transmitted to an OS and added to an OS event viewer, so that both OS and BIOS event information are aggregated at a single location.

Figure 7:
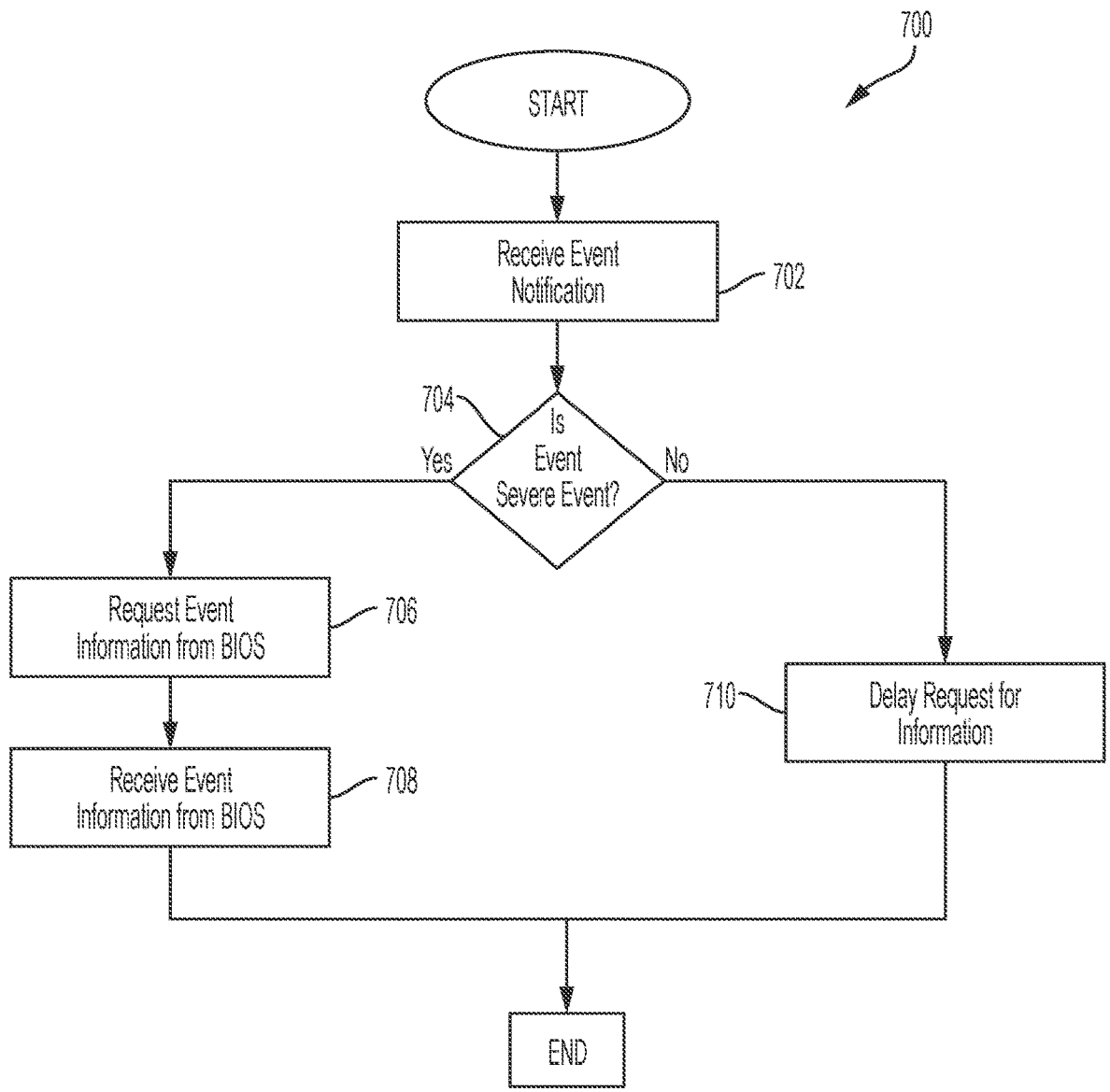
FIG. 7 is a flow chart of a method of retrieving event information from a BIOS depending on an event severity according to some embodiments of the disclosure.

In some embodiments, an OS of the information handling system may determine whether to request event information from a BIOS based upon a severity of a detected event. An example method 700 of requesting event information based on a severity of a detected event is shown in FIG. 7. The method 700 may begin, at step 702, with receipt of an event notification from a BIOS. For example, an OS may receive an event notification from a BIOS. The event notification may include information related to a type or category of the event, as well as information related to a severity of the event.

At step 704, the OS may determine whether the event is a severe event. For example, the OS may compare information related to a type or severity of the event with preferences manually entered by a user of the information handling system to determine if the event meets a severity threshold for an immediate information request or if the system can wait until a later time to request information. For example, a user may set a priority of events and the OS may request event information based on a priority of an event detailed in an event notification. Alternatively or additionally, a user may set a priority of events based on a size of event information to be transferred from the BIOS to the OS. For example, a user may set a cap as to a maximum number of BIOS events about which information can be transferred, or a maximum amount of data that can be transferred, from the BIOS to the OS within a predetermined time frame. In other embodiments, the system may automatically adjust a severity threshold based on actions of a user of the information handling system.

If the OS determines that the event is not a severe event, it may, at step 710, delay a request for information regarding the event from the BIOS. For example, the OS may delay a request for information regarding the event until a power event, such as a shutdown or system restart has occurred.

If the OS determines that the event is a severe event, it may, at step 706, request event information from the BIOS. The OS may then receive event information from the BIOS, at step 708, and may add the received event information to an event log of operating system. Requesting event information based on event severity can reduce system slowdown that may occur due to communication between a BIOS and an OS by avoiding communication of event information in situations where event information is not needed.

The flow chart diagrams of FIGS. 4-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for communication between a basic input/output system (BIOS) and an operating system (OS) of an information handling system, comprising:
    detecting, by the BIOS, a BIOS event, wherein the detecting comprises testing one or more components of the information handling system by the BIOS during a pre-boot stage to generate results;
    storing, by the BIOS, information regarding the BIOS event in an event log of a memory of the information handling system, wherein the storing comprises storing the results;
    retrieving, by the OS, at least a portion of the information regarding the BIOS event from the event log, wherein the retrieving comprises:
        when the OS has finished booting, transmitting a notification to the BIOS that the OS is ready to receive information regarding detected events; and
        transmitting, by the BIOS, at least part of the information regarding the event to the OS; and
    adding, by the OS, at least a portion of the retrieved information to an OS event viewer of the information handling system to allow access to aggregated OS and BIOS events by the OS event viewer.

2. The method of claim 1, wherein detecting, by the BIOS, an event comprises detecting, by an embedded controller of the information handling system, an event.

3. The method of claim 1, further comprising deleting, by the BIOS, the information retrieved, by the OS, from the event log.

4. The method of claim 1, wherein detecting, by the BIOS, an event comprises detecting an event at runtime of the OS.

5. The method of claim 4, further comprising notifying, by the BIOS, the OS that an event has been detected, wherein the step of retrieving is performed based, at least in part, on the notification.

6. The method of claim 5, wherein notifying the OS that an event has been detected comprises notifying the OS of a severity of the detected event and wherein the step of retrieving is performed based, at least in part, on the severity of the detected event.

7. An information handling system comprising:
    a processor; and
    a memory,
    wherein the processor is configured to perform steps comprising:
        detecting, by a basic input/output system (BIOS) of the information handling system, a BIOS event, wherein the detecting comprises testing one or more components of the information handling system by the BIOS during a pre-boot stage to generate results;
        storing, by the BIOS, information regarding the BIOS event in an event log of the memory of the information handling system, wherein the storing comprises storing the results; and
        retrieving, by an operating system (OS), at least a portion of the information regarding the BIOS event from the event log, wherein the retrieving comprises:
            when the OS has finished booting, transmitting a notification to the BIOS that the OS is ready to receive information regarding detected events; and
            transmitting, by the BIOS, at least part of the information regarding the event to the OS; and
        adding, by the OS, at least a portion of the retrieved information to an OS event viewer of the information handling system to allow access to aggregated OS and BIOS events by the OS event viewer.

8. The information handling system of claim 7, wherein detecting, by the BIOS, an event comprises detecting, by an embedded controller of the information handling system, an event.

9. The information handling system of claim 7, wherein the processor is further configured to perform steps comprising deleting, by the BIOS, the information retrieved, by the OS, from the event log.

10. The information handling system of claim 7, wherein detecting, by the BIOS, an event comprises detecting an event at runtime of the OS.

11. The information handling system of claim 10, wherein the processor is further configured to perform steps comprising notifying, by the BIOS, the OS that an event has been detected, wherein the step of retrieving is performed based, at least in part, on the notification.

12. The information handling system of claim 11, wherein notifying the OS that an event has been detected comprises notifying the OS of a severity of the detected event and wherein the step of retrieving is performed based, at least in part, on the severity of the detected event.

13. A computer program product, comprising:
    a non-transitory computer readable medium comprising instructions to perform steps comprising:
        detecting, by a basic input/output system (BIOS) of the information handling system, a BIOS event, wherein the detecting comprises testing one or more components of the information handling system by the BIOS during a pre-boot stage to generate results;
        storing, by the BIOS, information regarding the BIOS event in an event log of a memory of the information handling system, wherein the storing comprises storing the results;
        retrieving, by an operating system (OS) of the information handling system, at least a portion of the information regarding the BIOS event from the event log, wherein the retrieving comprises:
when the OS has finished booting, transmitting a notification to the BIOS that the OS is ready to receive information regarding detected events; and
transmitting, by the BIOS, at least part of the information regarding the event to the OS; and
adding, by the OS, at least a portion of the retrieved information to an OS event viewer of the information handling system to allow access to aggregated OS and BIOS events by the OS event viewer.

14. The computer program product of claim 13, wherein detecting, by the BIOS, an event comprises detecting an event at runtime of the OS.

15. The computer program product of claim 13, wherein the non-transitory computer readable medium further comprises code to perform steps comprising deleting, by the BIOS, the information retrieved, by the OS, from the event log.

* * * * *